United States Patent [19]

Robbins, III

[11] Patent Number: 5,226,551
[45] Date of Patent: Jul. 13, 1993

[54] REUSABLE AND RE-COLLAPSIBLE CONTAINER

[76] Inventor: Edward S. Robbins, III, 459 N. Court, Florence, Ala. 35630

[21] Appl. No.: 789,838

[22] Filed: Nov. 12, 1991

[51] Int. Cl.⁵ .................................................. B65D 6/12
[52] U.S. Cl. ........................................ 220/8; 220/666; 215/1 C; 222/143; 222/382; 222/464; 222/529; 222/530
[58] Field of Search ............... 220/666, 8; 215/1 C; 222/143, 382, 383, 385, 464, 527, 529, 530

[56] References Cited

U.S. PATENT DOCUMENTS

| | | | |
|---|---|---|---|
| 625,719 | 5/1899 | Crofford | 220/8 X |
| 640,418 | 1/1900 | Royer | 220/8 X |
| 1,040,652 | 10/1912 | Douglas | 220/8 |
| 1,048,935 | 12/1912 | Brady | |
| 2,784,882 | 3/1957 | Du Bois | |
| 2,880,902 | 4/1959 | Owsen | 220/8 |
| 2,893,167 | 7/1959 | Davidson | 220/8 X |
| 2,899,110 | 8/1959 | Parker | |
| 2,985,915 | 5/1961 | Winstead | |
| 3,143,429 | 8/1964 | Swanson et al. | |
| 3,156,383 | 11/1964 | Melli | |
| 3,220,544 | 11/1965 | Lovell | |
| 3,286,872 | 11/1966 | Burdick, Jr. | 220/8 X |
| 3,326,421 | 6/1967 | Peace | 222/530 X |
| 3,329,298 | 7/1967 | Demas | 220/8 |
| 3,467,283 | 9/1969 | Kinnavy | |
| 3,494,509 | 2/1970 | McGuire | |
| 3,578,415 | 5/1971 | Hiltz | 220/8 X |
| 3,608,268 | 9/1971 | Lauritzen | |
| 3,690,522 | 9/1972 | Chlystun | 222/529 |
| 3,864,771 | 2/1975 | Bauer et al. | |
| 3,875,941 | 4/1975 | Adair | |
| 4,087,024 | 5/1978 | Martin et al. | |
| 4,219,137 | 8/1980 | Hutchens | 222/530 |
| 4,428,507 | 1/1984 | Sneider | |
| 4,456,134 | 6/1984 | Cooper | |
| 4,492,313 | 1/1985 | Touzani | |
| 4,775,564 | 10/1988 | Shriver et al. | |
| 4,805,799 | 2/1989 | Robbins, III | |
| 4,815,615 | 3/1989 | Phlaphongphanich | |
| 4,846,376 | 7/1989 | Palmer | |
| 4,865,211 | 9/1989 | Hollingsworth | 220/8 |
| 4,873,100 | 10/1989 | Dirksing et al. | |
| 4,875,576 | 10/1989 | Torgrimson et al. | |
| 4,925,055 | 5/1990 | Robbins, III et al. | |
| 4,930,644 | 6/1990 | Robbins, III | 215/1 C |
| 4,979,628 | 12/1990 | Robbins, III | |
| 5,002,193 | 3/1991 | Touzani | |

FOREIGN PATENT DOCUMENTS

| | | |
|---|---|---|
| 1301970 | 8/1969 | Fed. Rep. of Germany |
| 2340967 | 3/1974 | Fed. Rep. of Germany |
| 587701 | of 0000 | France |
| WO88/05014 | 7/1988 | PCT Int'l Appl. |
| 2109247A | 6/1983 | United Kingdom |
| 2138525A | 10/1984 | United Kingdom |

Primary Examiner—Allan N. Shoap
Assistant Examiner—Stephen Cronin
Attorney, Agent, or Firm—Nixon & Vanderhye

[57] ABSTRACT

This invention relates to reusable and re-collapsible containers, and particularly to a one-piece container having a peripheral side wall which is arranged to include areas of differential wall thickness and diameter to thereby permit collapse of the container from an extended to a collapsed condition by reason of a telescoping relationship between the various portions of the peripheral side wall. Holders are also disclosed for optional use with the container.

11 Claims, 11 Drawing Sheets

REUSABLE AND RE-COLLAPSIBLE CONTAINER

RELATED APPLICATIONS

This application is generally related to applicant's copending applications Ser. No. 07/576,080 filed Aug. 31, 1990; Ser. No. 07/598,385 filed Oct. 18, 1990, now U.S. Pat. No. 5,114,011; Ser. No. 07/603,182 filed Oct. 24, 1990; Ser. No. 07/706,853 filed May 29, 1991 now U.S. Pat. No. 0,330,993 and Ser. No. 07/719,711 filed Jun. 26, 1991.

BACKGROUND AND SUMMARY OF THE INVENTION

This invention relates to reusable and re-collapsible containers, and particularly to a one-piece container having a peripheral side wall which is arranged to include areas of differential wall thickness and diameter to thereby permit collapse of the container from an extended to a collapsed condition by reason of a telescoping relationship between the various portions of the peripheral side wall.

Collapsible containers, drinking cups and the like are, of course, well known. For example, in applicant's own prior U.S. Pat. No. 4,930,644, a collapsible, thin film plastic container is disclosed wherein a major portion of the container side wall has a reduced wall thickness to permit random collapse of the side wall. In U.S. Pat. No. 4,865,211, a plastic bottle having a uniform wall thickness throughout the side wall, is configured to permit collapsing of the container through telescoping movement of one portion of the side wall into another portion of the side wall.

In U.S. Pat. No. 4,875,576, a container is disclosed wherein an intermediate portion of the side wall incorporates a bellows-type arrangement for facilitating collapse and extension of the container. The patent also discloses the use of helical creases which spiral or angle between first and second portions of the container side wall to facilitate collapsing action of the creased portion of the side wall.

In U.S. Pat. No. 4,873,100, a bi-stable, expandable plastic bottle is disclosed which incorporates a bellows-type side wall for movement between collapsed and extended positions.

In U.S. Pat. No. 2,880,902, a collapsible, drinking cup (or camera bellows) is disclosed wherein the side wall is composed of alternating thick and thin portions.

The present invention incorporates a number of features not previously found in the prior art and which result in simple, easy-to-use, low cost containers which may be used and reused by the consumer as desired, and which may be stored in a collapsed condition, maximizing storage space, etc. At the same time, by significantly reducing the thickness of the container side wall in an intermediate portion thereof, source reductions in the amount of plastic required to manufacture the containers are realized.

More specifically, in the various exemplary embodiments disclosed herein, one-piece blow molded containers are each formed with a peripheral side wall divided into upper, intermediate and lower portions of substantially the same axial length, with the upper and lower portions having significantly greater wall thickness than the intermediate portion. For example, the intermediate portion may have a wall thickness of preferably between about 2 and about 12 mils which permits the intermediate portion to reverse fold as the upper and lower portions, which may each have a wall thickness of at least about 35 mils and preferably in the range of about 35-45 mils, are moved toward one another in the aforementioned telescoping relationship.

It is also a feature of the invention that the peripheral side wall of each container include surface configurations which facilitate the axial collapse of the container. In one embodiment, a radially outwardly flared portion may be provided at the lowermost edge of the upper side wall portion which serves as a guide surface as the intermediate portion and lower portion are axially collapsed and telescoped into the upper portion. In this same embodiment, the interface between the intermediate and lower portions may be indented to further facilitate the collapsing action.

Another feature of this first embodiment which facilitates the axial collapse of the container is the provision for a plurality of obliquely oriented grooves within the intermediate, thin side wall portion which, upon slight twisting action imparted to one or the other (or both) of the upper and lower side wall portions, causes the intermediate portion to immediately collapse and reverse fold upon itself as the upper and lower portions are pushed toward each other.

It is another feature of the invention to provide gripping means at either end of the container to assist the user to collapse, extend and re-collapse the container during its useful life. For example, where the discharge opening in the top wall of the container is provided with a conventional screw cap arrangement, a radially outward directed flange just below the threaded portion provides a convenient first gripping location. At the lower end of the container, an annular groove may be provided where the lower portion of the side wall joins with the bottom wall to provide a second convenient and easily accessible gripping location. In an alternative to the above described arrangement, a radially outwardly directed foot or flange may be provided in the lower side wall portion and which extends radially beyond all of the side wall portions, so that the flange also serves to support the upper portion of the side wall when the container is in the collapsed condition. As yet another alternative to the lower gripping arrangement, a pull tab or ring may be formed integral with the bottom wall, and the tab or ring may be folded over and releasably latched in a horizontal, out of the way position so as to not to interfere with the stability of the container.

In alternative embodiments of the invention, the upper and lower peripheral side wall portions may be provided to a greater or lesser extent with a plurality of annular reinforcing ribs which provide hoop strength to these relatively thicker portions of the side wall, and which therefore also especially facilitate the telescoping action of the container to the collapsed condition.

It will also be appreciated that in order to achieve the above described telescoping/collapsing action, the cross sectional areas of the upper, intermediate and lower portions are successively and progressively reduced (or increased) in one or the opposite direction so that an overall tapering effect is achieved. Within the individual portions, the side wall may also have a slight taper in the same direction.

Additional embodiments of the invention are disclosed which are particularly adapted for use as 2 ½ gallon water (or other liquid) containers, and which are provided with a valve mechanism in the lower portion of the peripheral side wall. In these embodiments, an internal vacuum is created through the dispensing of the container contents which thereby causes the container side wall portions to collapse automatically by means of the above described telescoping action.

In another aspect of the invention, external holders are provided for optional use with the containers. These holders, which may also have insulating properties to retain heat or cold, are designed to support the container and to facilitate pouring of the contents from the container.

Accordingly, in its broader aspects, the present invention relates to a collapsible, extendable and recollapsible, plastic container comprising a bottom wall; a top wall; and a peripheral side wall extending between the bottom wall and the top wall, the side wall having at least three axially extending portions of substantially equal length, including an upper portion, an intermediate portion and a lower portion, wherein the intermediate portion has a wall thickness less than wall thicknesses of the upper and lower portions, and wherein cross-sectional areas of the side wall portions progressively vary so that the upper and lower portions may be telescoped one into the other with the intermediate portion reverse folded therebetween, and wherein a dispensing opening is provided in one of the top wall and peripheral side wall.

Additional objects and advantages of the invention will become apparent from the detailed description which follows.

BRIEF DESCRIPTION OF THE DRAWINGS

FIG. 16 is a partial perspective view illustrating an alternative top wall construction for the container illustrated in FIG. 14;

FIG. 17 is a cross-sectional view of the container illustrated in FIG. 14 incorporating the top wall arrangement of FIG. 16, but shown in a collapsed condition;

FIG. 18 is a partial perspective view of a collapsible container in accordance with another exemplary embodiment of the invention;

DETAILED DESCRIPTION OF THE DRAWINGS

Figure 1:
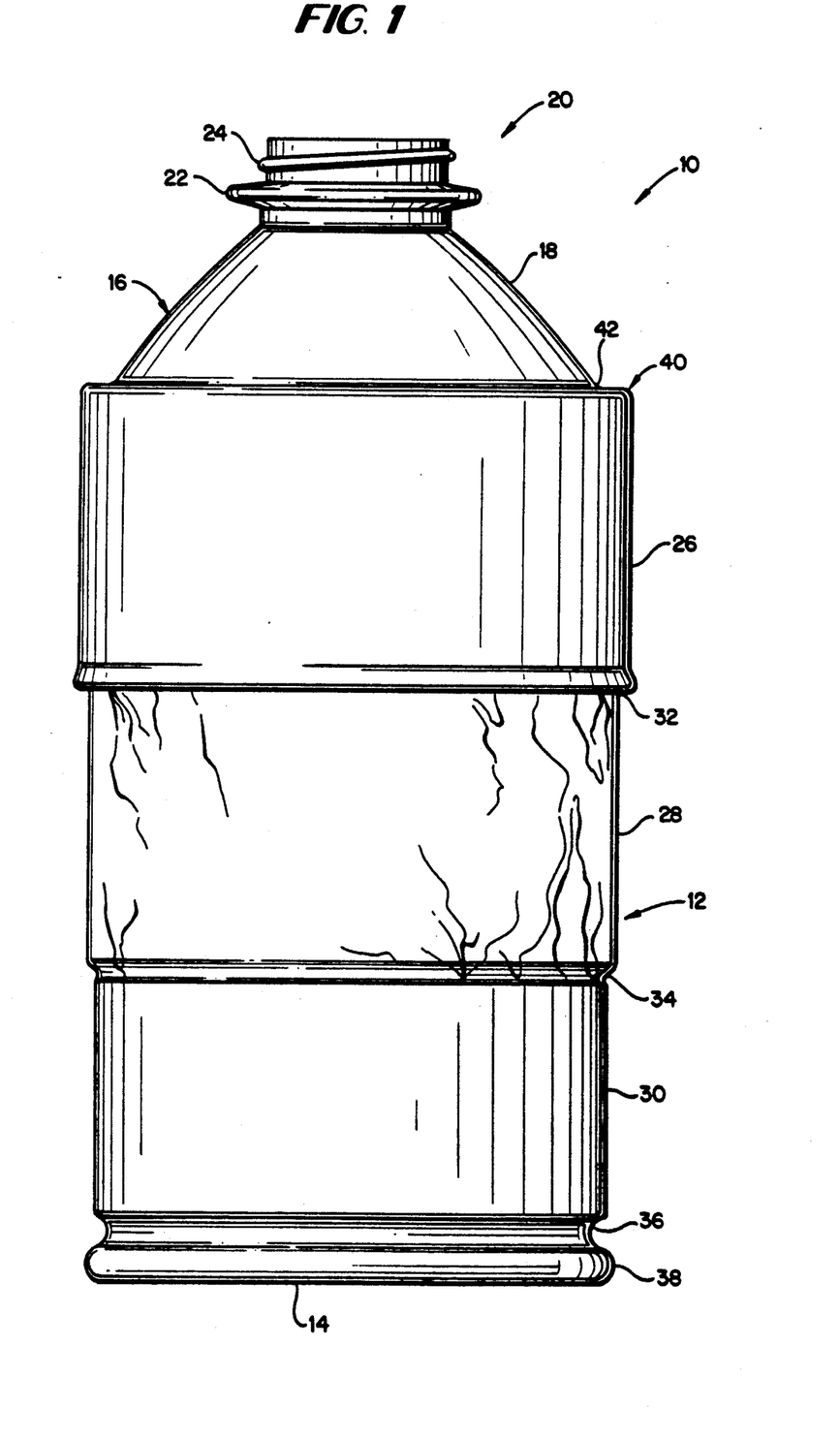
FIG. 1 is a side elevation of a collapsible container in accordance with a first exemplary embodiment of the invention.
Figure 2:
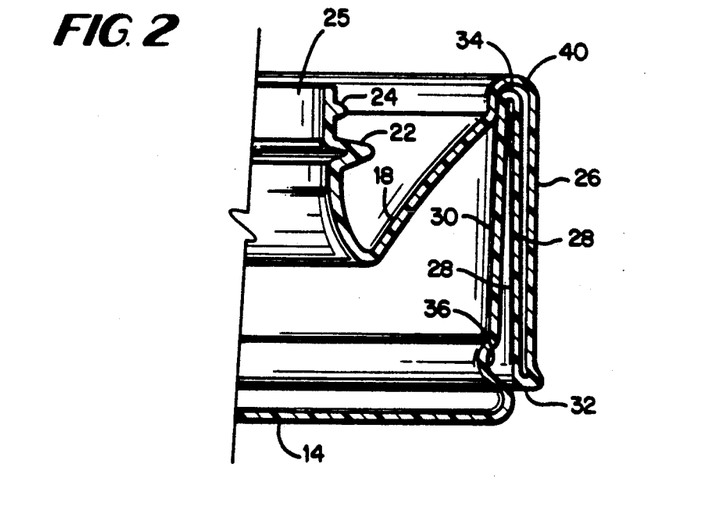
FIG. 2 is a partial cross-sectional view of the container illustrated in FIG. 1, but in a collapsed condition.

With reference to FIG. 1, a container 10 in accordance with the first exemplary embodiment of the invention generally includes a peripheral side wall 12, a bottom wall 14, and a top wall 16 which, in this embodiment, includes a radially inwardly and upwardly tapered shoulder section 18 and an upstanding dispensing or neck portion 20 including a radially outwardly directed annular flange 22, an exteriorly threaded portion 24 adapted to receive a conventional screw cap (not shown), and a discharge opening 25 (see FIG. 2).

The peripheral side wall 12 in this exemplary embodiment is formed to include three axial portions of substantially equal axial length, including an upper portion 26, an intermediate portion 28 and a lower portion 30. The upper and lower portions 26, 30 have minimum side wall thicknesses of about 15 mils. The maximum thicknesses of these portions may be considerably greater depending on the desired amount of rigidity. An exemplary thickness for side wall portions 26 and 30 may be, for example, at least about 35 mils and preferably in the range of about 35 to 45 mils. The bottom wall 14 and dispensing portion 20 (and especially the threaded portion 24) may be substantially thicker if desired. The intermediate side wall portion 28 may have a minimum thickness of about 2 mils and a preferred thickness of between about 2 and 12 mils (i.e., a ratio of each of the thicknesses in the upper and lower side wall portions to the thickness of the intermediate side wall portion is at least 3.75 to 1). Thus, while the upper and lower side wall portions 26 and 30 are flexible, they are relatively rigid as compared to the much thinner intermediate portion 28. This arrangement permits easy collapse, extension and re-collapse of the container in a manner described in more detail below. This construction may also result in a source reduction of the amount of plastic material required to make the container and, of course, the reduced profile of the container in the collapsed condition permits reduced volumes of post consumer waste.

In order to achieve the telescoping action which enables collapse, expansion and recollapse of the container, the upper side wall portion 26, intermediate side wall portion 28, and lower side wall portion 30 have, in this embodiment, slightly reduced, respective diameters from top to bottom. It should be noted that reference is made to the "diameters" of the various side wall portions for those instances where the containers are substantially round. For other cross-section shapes, it is more appropriate to refer to "cross-sectional areas" of the respective side wall portions. For purposes of convenience here, round containers are described but the invention embraces other container shapes as well.

The three described side wall portions 26, 28 and 30 may be separated by a pair of transitional steps or areas 32, 34. The upper transitional step or area 32 comprises a radially outwardly flared portion which serves as a guide means as the intermediate portion 28 is reverse folded into the upper portion 26, as described in greater detail below.

The lower transitional step or area 34 comprises a radially inwardly directed tuck or indentation which forms a groove facilitating telescoping of the lower side wall portion 30 into the upper portion 26, as well as the reverse folding, or rolling action of the intermediate side wall portion 28 relative to lower side wall portion 30.

At the lower end of side wall portion 30, there is provided an annular groove 36 which enables the user to grip the lower side wall portion during collapse but especially during extension of the container as also described in greater detail below. A second gripping area at the opposite end of the container is provided by the radial flange 22.

At the upper end of the container, the upper side wall portion 26 merges with the radially inwardly directed tapered neck 18 at a peripheral lip 40 and shallow, substantially horizontal annular groove 42, facilitating separate movement of the top wall 16 between collapsed and extended positions also described below. In this regard, the tapered shoulder 18 may have a relatively thin wall thickness similar to that of the intermediate portion 28.

Figure 5:
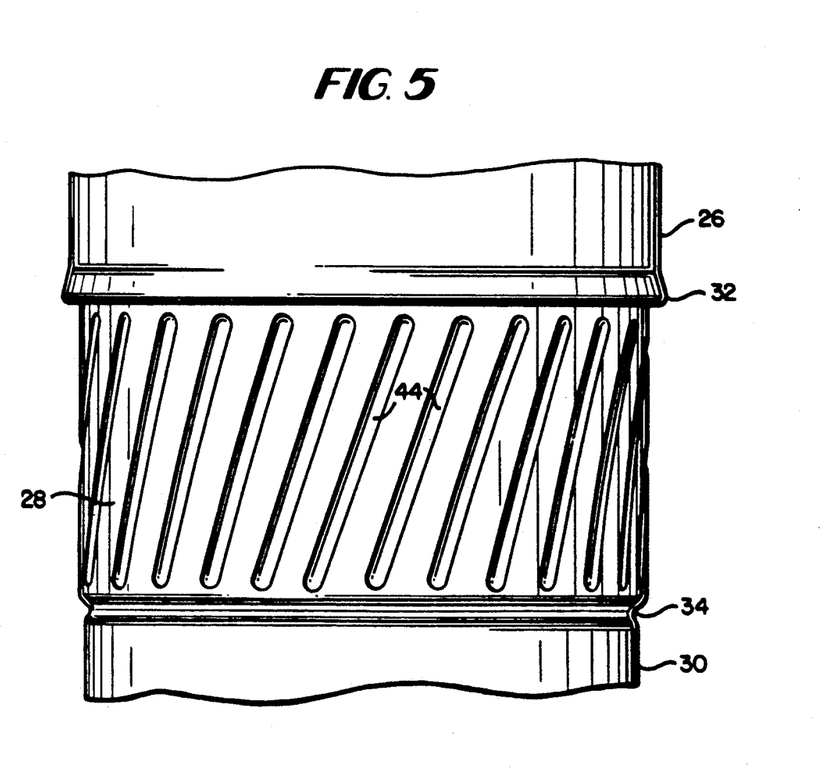
FIG. 5 is a partial elevation of a container in accordance with this invention, incorporating oblique grooves in an intermediate side wall portion of the container.

To even further facilitate the collapsing/telescoping action, the intermediate portion 28 may be provided with a plurality of peripherally arranged depressions or grooves 44 which are oriented obliquely to the longitudinal axis of the container, as illustrated in FIG. 5. Thus, upon the exertion of a slight twisting movement to the lower portion 30, relative to upper portion 26 (or vice versa), the intermediate portion 28 immediately begins to collapse and reverse fold as the upper and lower portions 26, 30 move relatively toward each other.

The container 10 may be collapsed to the condition illustrated in FIG. 2 by gripping the container via flange 22 and groove 36 (this is not essential, however) and exerting an axial compressive force at the upper and lower ends of the container. In so doing, the thin intermediate portion 28 is caused to double back on itself, or reverse fold, as the upper and lower portions 26, 30 are telescoped one within the other. In the collapsed condition, as seen in FIG. 2, it will be appreciated that the thin intermediate portion 28 is sandwiched between the thicker upper and lower side wall portion 30.

To complete the collapsing action, the top wall 16 (including the radially inwardly tapered shoulder section 18 and upstanding dispensing portion 20) may be collapsed axially as shown in FIG. 2, so that the dispensing portion 20 does not protrude above the peripheral lip 40, or so that portion 20 extends partially above the lip. This permits efficient stacking and/or nesting of a plurality of the above described containers for shipment, storage and the like.

The container may be shipped empty from the manufacturer for filling at another location, or for future use by the consumer. In the event the container is to be shipped with contents, such as a concentrate, powdered mix or the like, the contents are conveniently added after the container is in the collapsed condition. The consumer would then add liquid (water, juice, etc) upon extension of the container as described below.

To convert the container to its fully expanded or extended condition, the user may conveniently grip the container at opposite ends via radial flange 22 and groove 36 and simply pull the container in opposite directions. Upon full extension of the side wall to the condition illustrated in FIG. 1, the user may then pull the top wall 16 outwardly to its fully extended position as also shown in FIG. 1.

Figure 4:
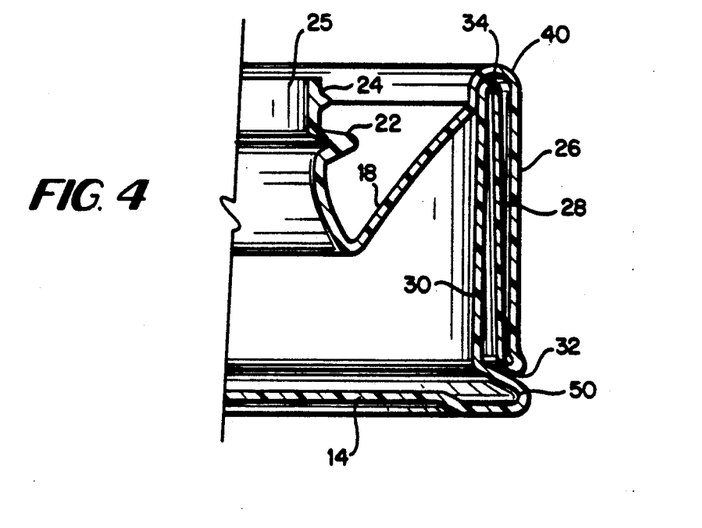
FIG. 4 is a partial cross-sectional view similar to the container shown in FIG. 2, but with a different lower side wall/bottom wall arrangement.

It will be appreciated that other bottom wall configurations may be utilized in order to facilitate especially the movement of the container from the collapsed to the extended condition. For example, rather than the above described groove 36, the lower side wall portion 30 may simply terminate at a radially outwardly directed flange or foot 50 as shown in FIG. 4, which not only provides a convenient grasping point for the user, but also provides increased stability for the upper and intermediate portions 26, 30 of the container in the collapsed condition.

Figure 3:
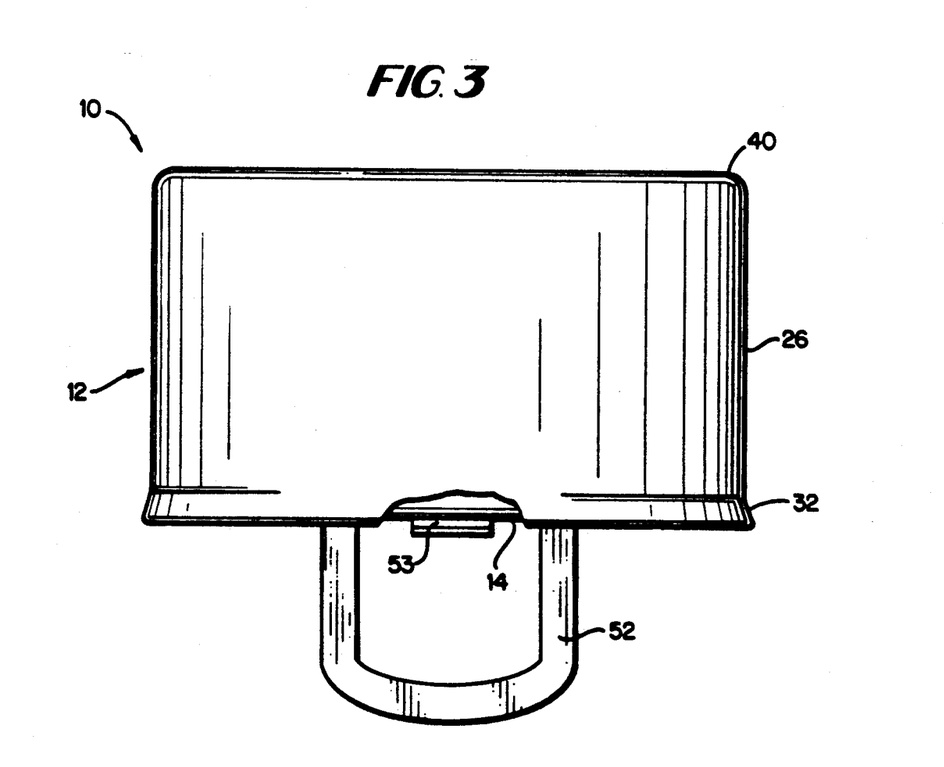
FIG. 3 is a side elevation view of the container of FIG. 1, but in a collapsed condition, and further illustrating the incorporation of an integral pull tab within the bottom wall of the container.

Still another variation of the lower gripping arrangement is shown in FIG. 3 where pull tab or ring 52 is provided on the bottom wall 14 of the container. It will be appreciated that the tab or ring 52, which may be integral with the bottom wall 14, may be folded over and locked in horizontal position (by means of an integral notch 53 or other suitable means) so as to hold the tab 52 in an out of the way position when not in use. Because the bottom wall 14 is recessed, the tab will not interfere with the stability of the container.

Figure 6:
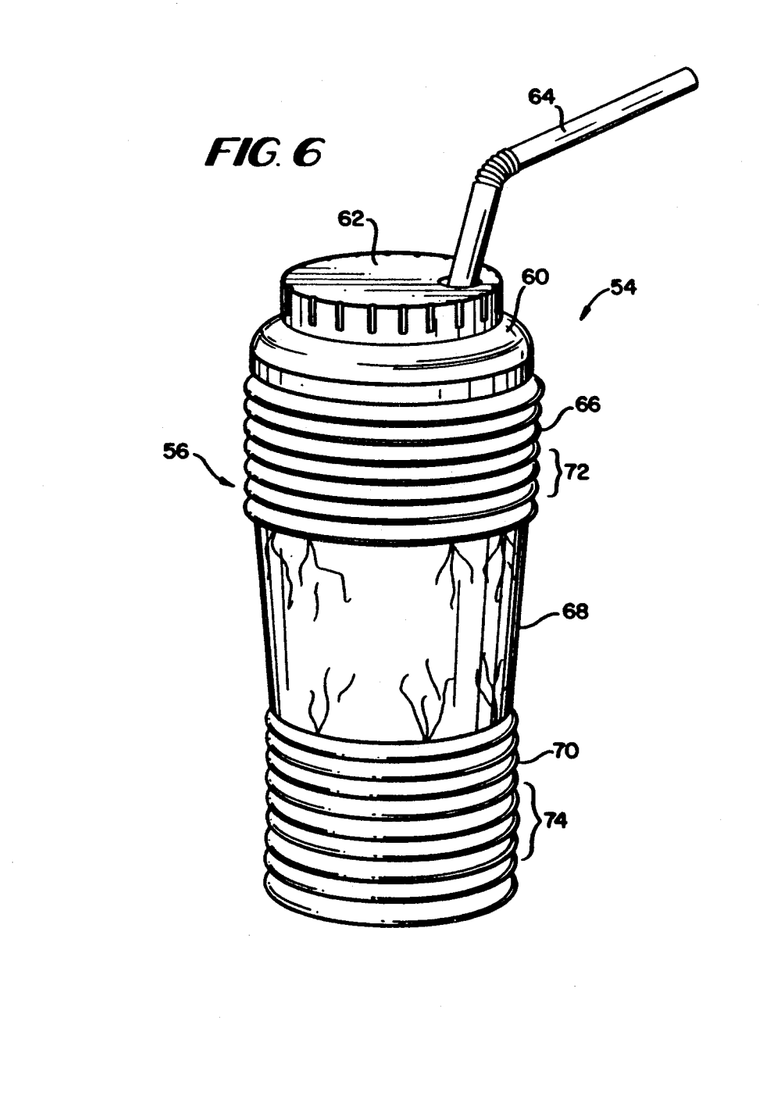
FIG. 6 is a perspective view of a collapsible container in accordance with another exemplary embodiment of the invention.

Turning now to FIG. 6, another exemplary embodiment of the invention is disclosed in conjunction with a "sports bottle" 54 which includes a peripheral side wall 56, a bottom wall 58 and a top wall 60 defining a discharge opening closed by a removable lid 62 (which may be of the conventional screw thread or snap-on types) and an integral or separable straw 64.

Figure 7:
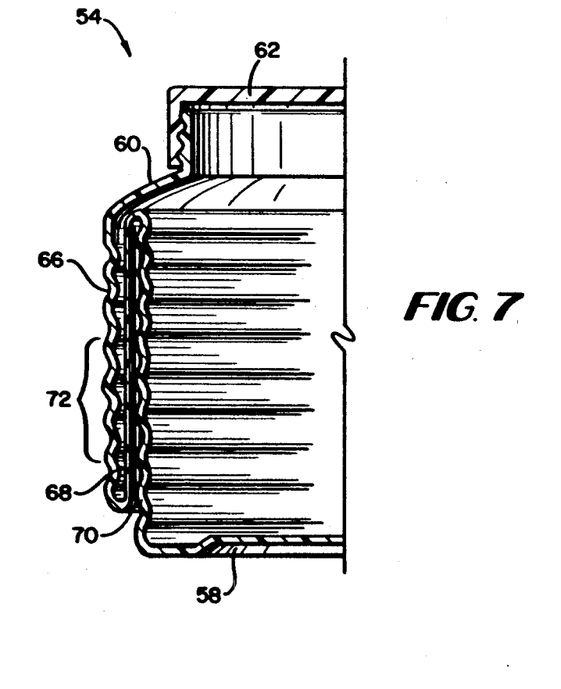
FIG. 7 is a partial cross-sectional view of the container illustrated in FIG. 6, but shown in the collapsed condition.

In this embodiment, the peripheral side wall 56 of the container 54 is again separated into upper, intermediate and lower portions 66, 68 and 70 with the upper and lower side wall portions having a greater wall thickness than the intermediate thin wall section 68. The specific thicknesses may be similar to those described above in conjunction with the first described embodiment. In this exemplary embodiment, however, the upper and lower portions 66 and 70 may be formed with groups of integral, annular reinforcing ribs 72, 74, respectively which provide additional hoop strength for the upper and lower side wall portions (the shape of which does not change during the collapse or extension of the container. By rigidifying the upper and lower side wall portions 66, 70 (without having to increase the wall thickness thereof) the collapsing and telescoping movements of the side wall portions of the container are greatly facilitated It will be appreciated in this regard that the transition areas between the ribbed upper and lower portions 66, 70 and intermediate portion 68 serve as "hinges" for the intermediate portion 68 as the latter is reverse folded during collapse and extension. As a practical matter, the annular ribbing may only extend a short distance above and below the intermediate thin wall portion 68 to provide the required strength. On the other hand, the entire upper and lower portions 66, 70 may be provided with such annular ribs as shown in FIGS. 6 and 7. Where ribs 74 extend to the bottom of lower portion 70, they will provide a gripping area for the user, thereby eliminating the need for a separate groove (as 36) or flange (as 50). A pull tab or ring such as 52 may nevertheless be employed if so desired.

As in the earlier described embodiment, the peripheral side wall 56 of the container 54 is constructed to have diameters in the upper, intermediate and lower portions 66, 68 and 70 which progressively decrease from top to bottom, such that in the collapsed condition, the intermediate and lower side wall portions 68, 70 lie radially within the upper side wall portion 66 as shown in FIG. 7. This is referred to as a "bottom fold" arrangement.

Figure 8:
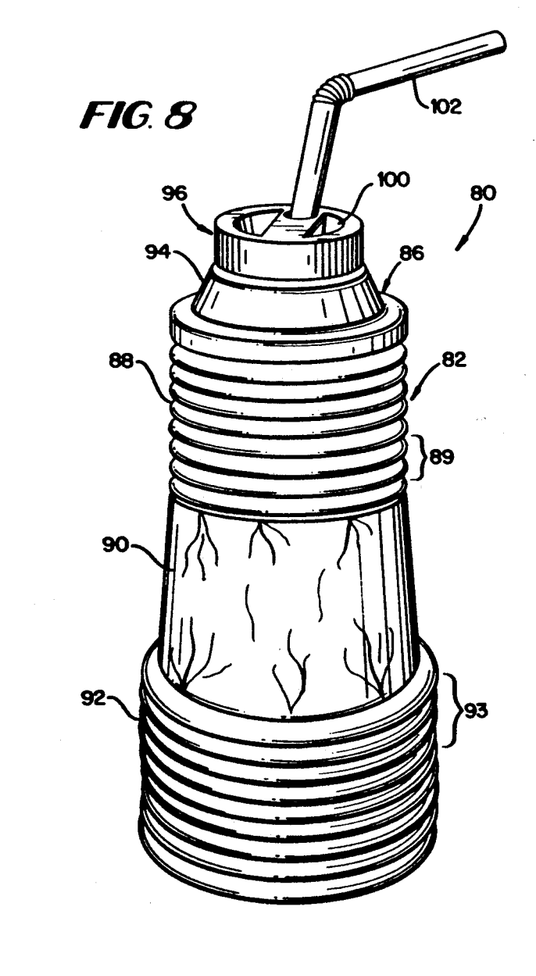
FIG. 8 is a perspective view of a collapsible container in accordance with yet another embodiment of the invention.
Figure 9:
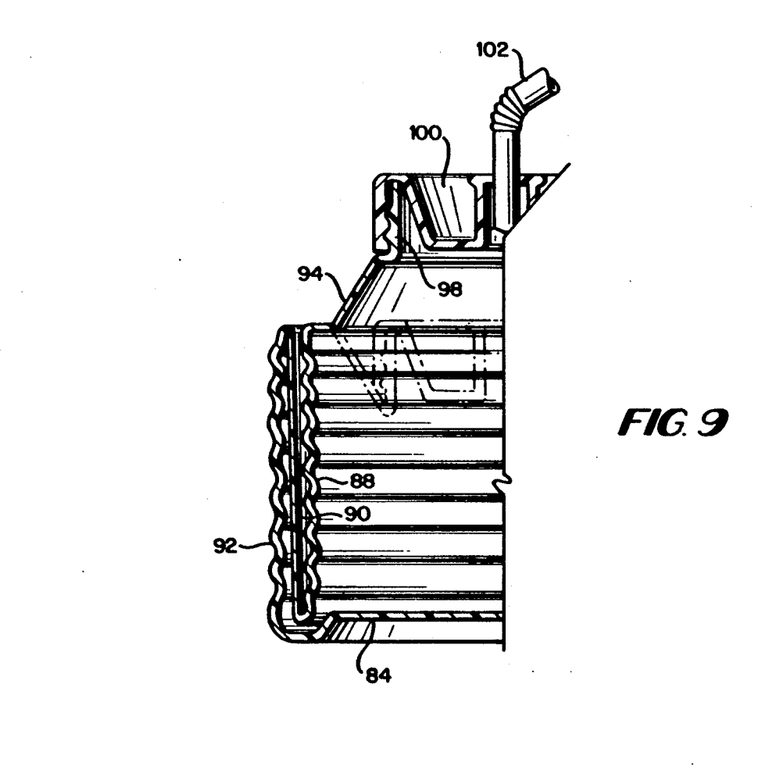
FIG. 9 is a partial cross-sectional view of the container illustrated in FIG. 8, but shown in the collapsed condition.

In still another exemplary embodiment of the invention, as best seen in FIGS. 8 and 9, a "top fold arrangement" is utilized wherein the respective diameters of the side wall portions progressively increase from top to bottom. Specifically, the container 80 includes a peripheral side wall 82, a bottom wall 84 and a top wall 86. Side wall 82 includes upper, intermediate and lower portions 88, 90 and 92 which have wall thicknesses similar to those in the earlier described embodiments, and upper and lower portions 88 and 92 are provided with annular ribs 89, 93, respectively. In this embodiment, the top wall 86 includes a tapered (thin wall) neck or shoulder 94 and is provided with a thickened, open-ended dispensing portion 96 including screw threads 98 for receiving a conventional finger grip type cap 100 which is also provided with an integral or separable drinking straw 102. As shown in phantom in FIG. 9, neck or shoulder 94 and dispensing portion 96 are also collapsible to a low profile position where the container cap or lid 100 does not extend above the upper side wall portion 88 of the peripheral side wall 82. In the collapsed condition as illustrated in FIG. 9, the intermediate and lower side wall portions 90, 92 lie radially outside the upper side wall portion 88.

Figure 10:
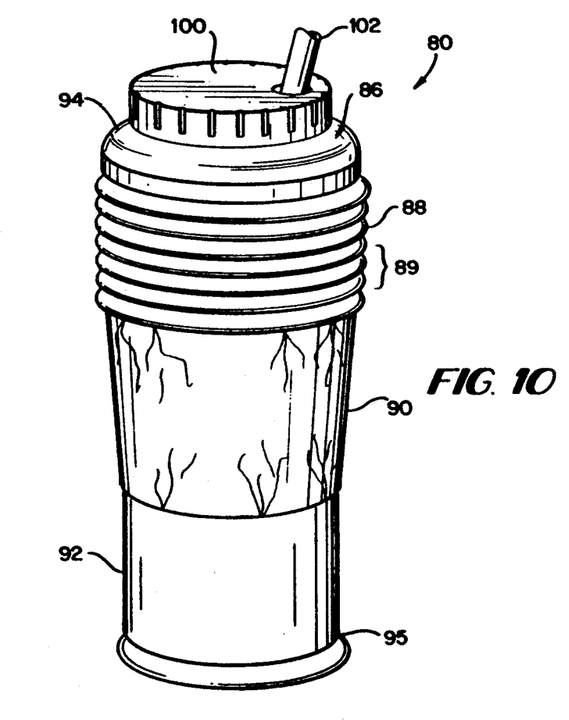
FIG. 10 is a perspective view of a collapsible container in accordance with still another exemplary embodiment of the invention.
Figure 10A:
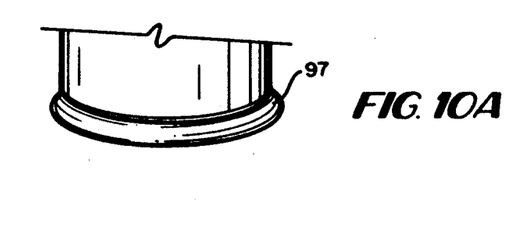
FIG. 10A is a partial perspective view illustrating an alternative bottom end configuration for the container illustrated in FIG. 10.
Figure 11:
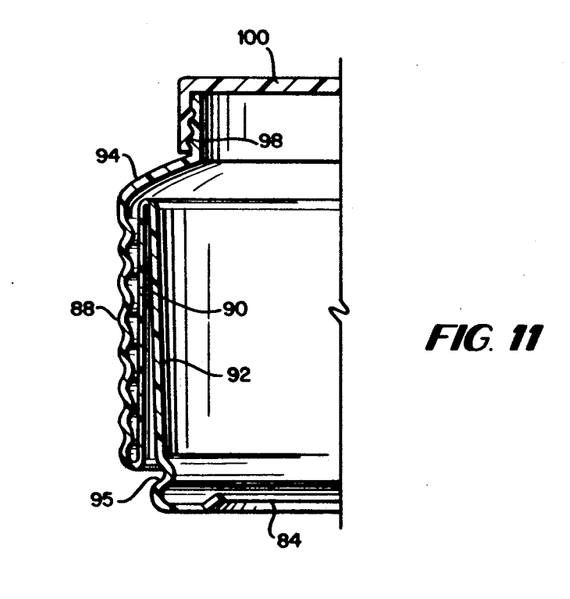
FIG. 11 is a partial cross-sectional view of the container illustrated in FIG. 10 but shown in the collapsed condition.
Figure 11A:
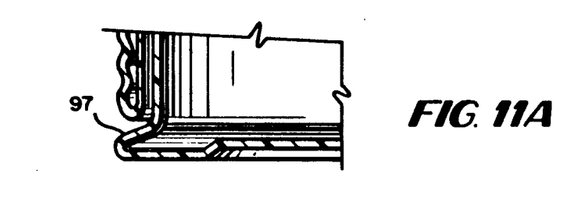
FIG. 11A is a partial cross-sectional view illustrating the container of FIG. 10 in a collapsed condition, but with the bottom configuration illustrated in FIG. 10A.
Figure 12:
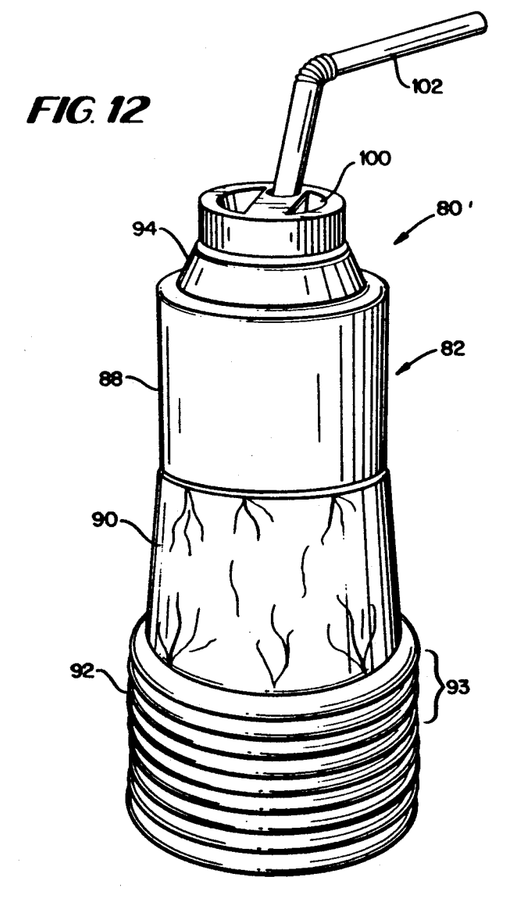
FIG. 12 is a perspective view of a collapsible container in accordance with another exemplary embodiment of the invention.
Figure 13:
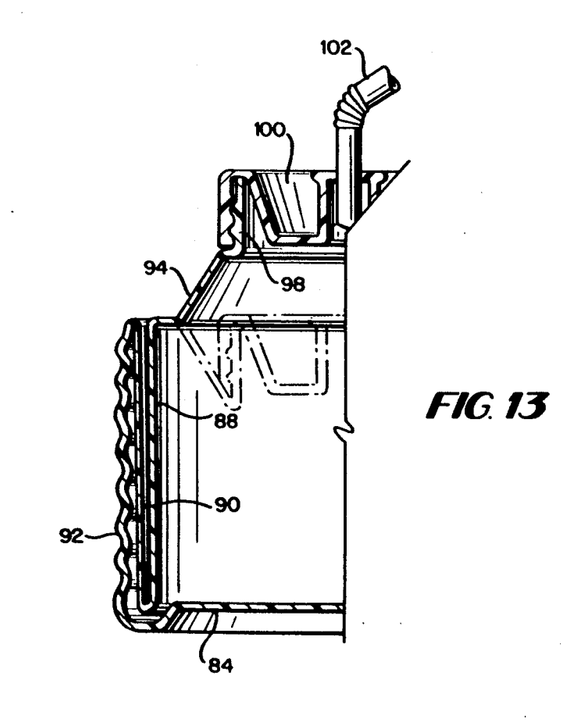
FIG. 13 is a partial cross sectional view of the container illustrated in FIG. 12 with the container shown in the collapsed condition.

It will be appreciated that various arrangements of the annular reinforcing ribs may be provided which are nevertheless still within the spirit and scope of this invention. For example, as shown in FIGS. 10 through 13, the thicker portion (upper or lower) of the container side wall which is to telescopingly receive the intermediate thin wall portion can be provided with the annular ribs while the remaining thicker side wall portion remains smooth. Thus, as shown in the bottom fold arrangement of FIGS. 10 and 11 (similar to FIGS. 6 and 7), only the upper side wall portion 88 is ribbed, while in the top fold arrangement of FIGS. 12 and 13 (similar to FIGS. 8 and 9), only the bottom side wall portion 92 is ribbed. Here again, the annular ribs 89 or 93 are optionally provided primarily to increase the hoop strength of the particular side wall portion in order to facilitate the axial collapse of the container.

Where the lower portion 92 remains smooth (FIGS. 10 and 11) it is advantageous to provide a single annular groove 95 to serve as a gripping area. As previously described, an alternative to an annular groove, a radially outwardly extending flange or foot 97 may be employed as a gripping means, as shown in FIGS. 10A and 11A.

It is also to be noted that by providing at least one annular rib 89 at the interface of upper portion 88 and intermediate portion 90 (FIGS. 10 and 11), and at least one annular rib 93 at the interface of lower portion 92 and intermediate portion 90 (FIGS. 12 and 13), guide surfaces such as the flared area 32 (FIGS. 1 and 2) are unnecessary, is substantially mooted, although similar flared areas could be provided within the ribbed area if desired. Alternatively, transition areas 32, 34 and ribs 89, 93 may be omitted, for example as a cost-saving measure, but recognizing that when present, they do serve to enhance the collapsing and recollapsing action of the side wall.

Figure 14:
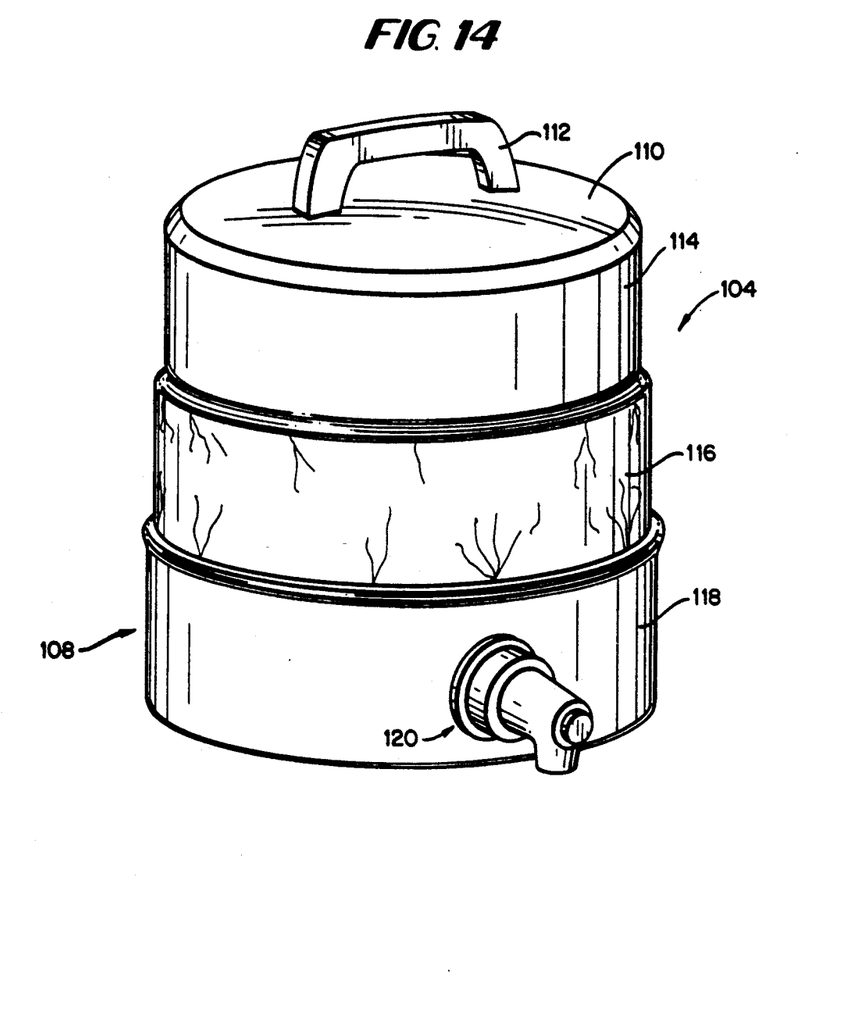
FIG. 14 is a perspective view of a collapsible container in accordance with another exemplary embodiment of the invention.
Figure 15:
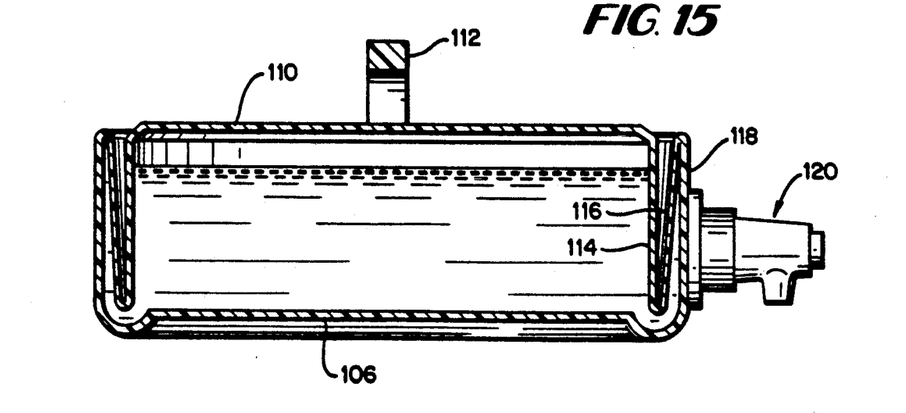
FIG. 15 is a cross-sectional view of the container illustrated in FIG. 14, but shown in the collapsed condition.

With reference now to FIGS. 14 and 15, still another exemplary embodiment of the invention is illustrated, and this particular design is especially advantageous in the form of, for example, 2½ gallon liquid (such as water) containers. With reference specifically to FIG. 14, the water container 104 includes a bottom wall 106, a peripheral side wall 108 and a top wall 110 with, if desired, a carrying handle 112 which may be formed integrally with the top wall 110. The peripheral side wall 108 is divided into upper, intermediate and lower portions 114, 116 and 118, respectively, again with the upper and lower portions 114 and 118 having wall thicknesses that are greater than the intermediate thin wall portion 116 (within the ranges disclosed hereinabove). In this particular embodiment, a dispensing valve 120 is incorporated within the lower side wall portion 118 for dispensing liquid from the container. With the above described arrangement, and upon dispensing of liquid from the container 104, a vacuum will be drawn on the inside of the container, to thereby automatically collapse the container as a function of the amount of liquid dispensed therefrom. It will be appreciated that eventually the container will assume the collapsed position shown in FIG. 15 (in the same manner as in the embodiments illustrated in FIGS. 8 and 12). From this point, however, in order to dispense the remaining amount of liquid from the container, either the container itself or the valve 116 must be vented. This can be achieved in accordance with any number of known venting techniques.

The above described container 104 is a "top fold" type wherein the upper and intermediate side wall portions 114, 116 are received telescopically within the lower side wall portion 118 by reason of the progressively increasing diameters of side wall portions 114, 116 and 118 in a direction from top to bottom. In the larger containers such as the 2½ gallon (and up) type illustrated in FIG. 14, where wall thicknesses are at the higher end of the ranges described above, it is not as important to provide a flared and/or indented area as shown at 32 and 34, respectively, in FIGS. 1 and 2, but such areas may be incorporated therein if otherwise desired.

FIGS. 16 and 17 illustrate a variation of the container illustrated in FIGS. 14 and 15 (with similar reference numerals used where appropriate, but with a prime designation added) insofar as the top wall 110' of the container 104' is shown to include a thin tapered shoulder section 122 terminating at a flat top wall 124 which is provided with an integral handle 112'. As best seen in FIG. 17, this top wall arrangement is collapsible in a manner similar to that described above in connection with FIGS. 1–4, 8, 9, 12 and 13.

It will be appreciated from the earlier described embodiments, that the upper and lower peripheral side wall portions 114, 118 (and 114', 118') may be provided with a plurality of annular ribs 126, 128 extending along the entire length of such portions as shown in FIG. 18, or at least in the area adjacent the interface with the intermediate side wall portion 116 to facilitate collapse of the container as previously described.

With all of the above described embodiments, it will be appreciated that the optional incorporation of integral handles and/or gripping areas allows the container not only to be collapsed but also to be extended and then recollapsed repeatedly, so that the containers are not limited to a single use. In other words, the consumer may reuse the container for any desired purpose following the initial use of the container, and the collapsible/expandable/recollapsible feature facilitates compact storage of the container between such uses. It should be further appreciated that this invention is applicable to containers of various sizes, from, for example, a pint up to 5 gallons or more.

With reference now to FIGS. 19 through 23, there may be occasions where it is desirable to hold or support any of the above described containers, and especially those disclosed in FIGS. 1 through 13 within an external container holder. Such holders typically provide support for associated containers and facilitate the pouring of contents therefrom, while in some instances, the holders may also provide thermal insulation to maintain the contents of the containers in a heated or cooled state.

Figure 19:
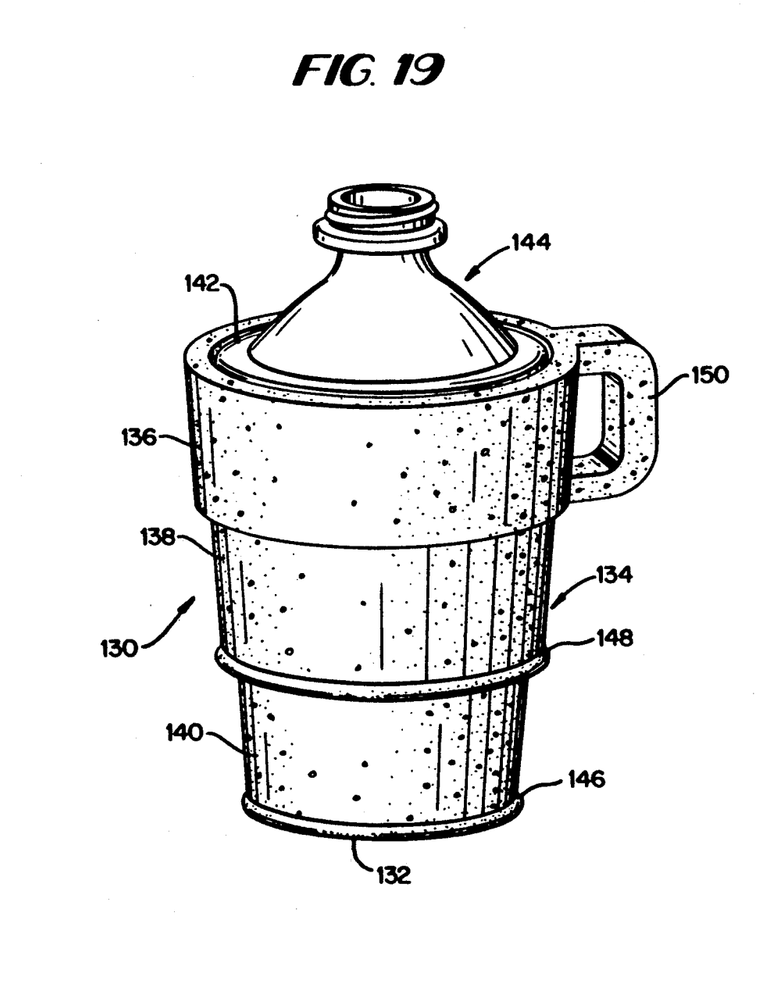
FIG. 19 is a perspective view of a collapsible container in accordance with the invention in further combination with a collapsible holder.

In FIG. 19, for example, a collapsible styrofoam holder 130 is disclosed which comprises a plurality of annular styrofoam sections or rings arranged in telescoping relationship with respect to each other. Specifically, the holder 130 includes a bottom wall 132 and a peripheral side wall 134 including three discrete slidably associated side wall sections or rings 136, 138 and 140. The uppermost ring or section 136 terminates at an upper open end 142 which receives the container 144.

The three annular side wall sections or rings 136, 138 and 140 are generally cylindrical in shape (or slightly tapered—inwardly from top to bottom) but with progressively increased diameters from bottom to top, i.e., section 136 has a larger diameter than section 138, while section 138 has a larger diameter than section 140.

The lower section 140 terminates at its upper end in a radially outwardly directed flange (not shown) which is adapted to seat in a complementary groove (not shown) provided in the interior surface of section 138 near the lowermost edge thereof. At the same time, the upper end of the intermediate section 138 terminates at its upper end in a radially outwardly directed flange (not shown) which is adapted to seat in a complimentary groove (not shown) provided in the interior surface of upper section 136 near the lowermost edge thereof. The lowermost end of the lower side wall section 140 is also provided with a radially outwardly directed flange or seat 146, and the lower end of the intermediate side wall section 138 is provided with a similar flange or seat 148. As a result of this arrangement, it will be appreciated that the container holder 130 in its fully extended position is releasably locked by reason of the interaction of the above described radially outwardly directed flanges and cooperating grooves. The holder may be collapsed simply by the application of axially directed forces from opposite ends of the holder so that the lowermost section 140 and intermediate section 138 will be telescoped substantially entirely within upper section 136. In the collapsed condition, flange 146 will support the intermediate section 138, and flange 148 will support upper section 136 and will prevent axial separation of the respective side wall sections.

Another feature of the holder 130 is the provision of an integral handle 150 in the uppermost side wall section 136 to facilitate holding and pouring of contents from the container 144 when supported within the holder 130.

The annular step or shoulder created between upper section 136 and intermediate section 138 may correspond to, and be engaged by, a similar step (such as flared area 34 in FIG. 1) between upper and intermediate side wall portions of the container. A similar arrangement may exist at the interface of holder sections 138 and 140 and related intermediate and lower portions of the container side wall.

Figure 20:
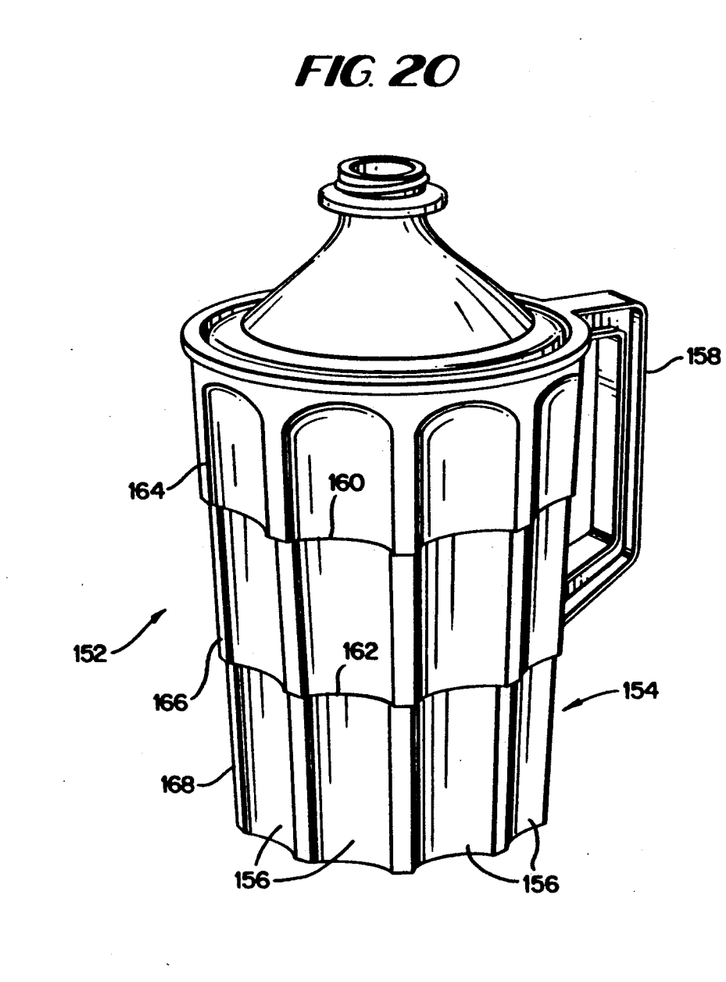
FIG. 20 is a perspective view of a container in accordance with this invention in combination with an alternative holder.

In FIG. 20, a one-piece non-insulating holder 152 is illustrated which includes a bottom wall (not shown) and an open upper end. The holder side wall 154 is provided with a plurality of vertically oriented scalloped areas or shallow grooves 156 which facilitate gripping of the holder 152 in the event handle 158 is not attached to, or formed with the holder. The scalloped design, of course, may be utilized in addition to the handle if so desired. In any event, this holder is provided with a pair of annular steps or shoulders 160 and 162 which establish progressively reduced diameter side wall portions 164, 166 and 168. The steps 160, 162 may be adapted to engage annular steps or shoulders in the peripheral side wall of the container so as to provide a further degree of support. The holder illustrated in FIG. 20 may be constructed of plastic or other suitable material, and may take a variety of shapes although, it is desirable that the interior surface configuration generally complement the side wall configuration of the container. In the event the peripheral side wall 154 of the holder is tapered inwardly as shown, the holder bottom wall may be omitted. If the holder is substantially cylindrical on the other hand, it will be appreciated that a bottom wall (or at least an annular horizontal support shelf) will be necessary to provide the required support.

Figure 21:
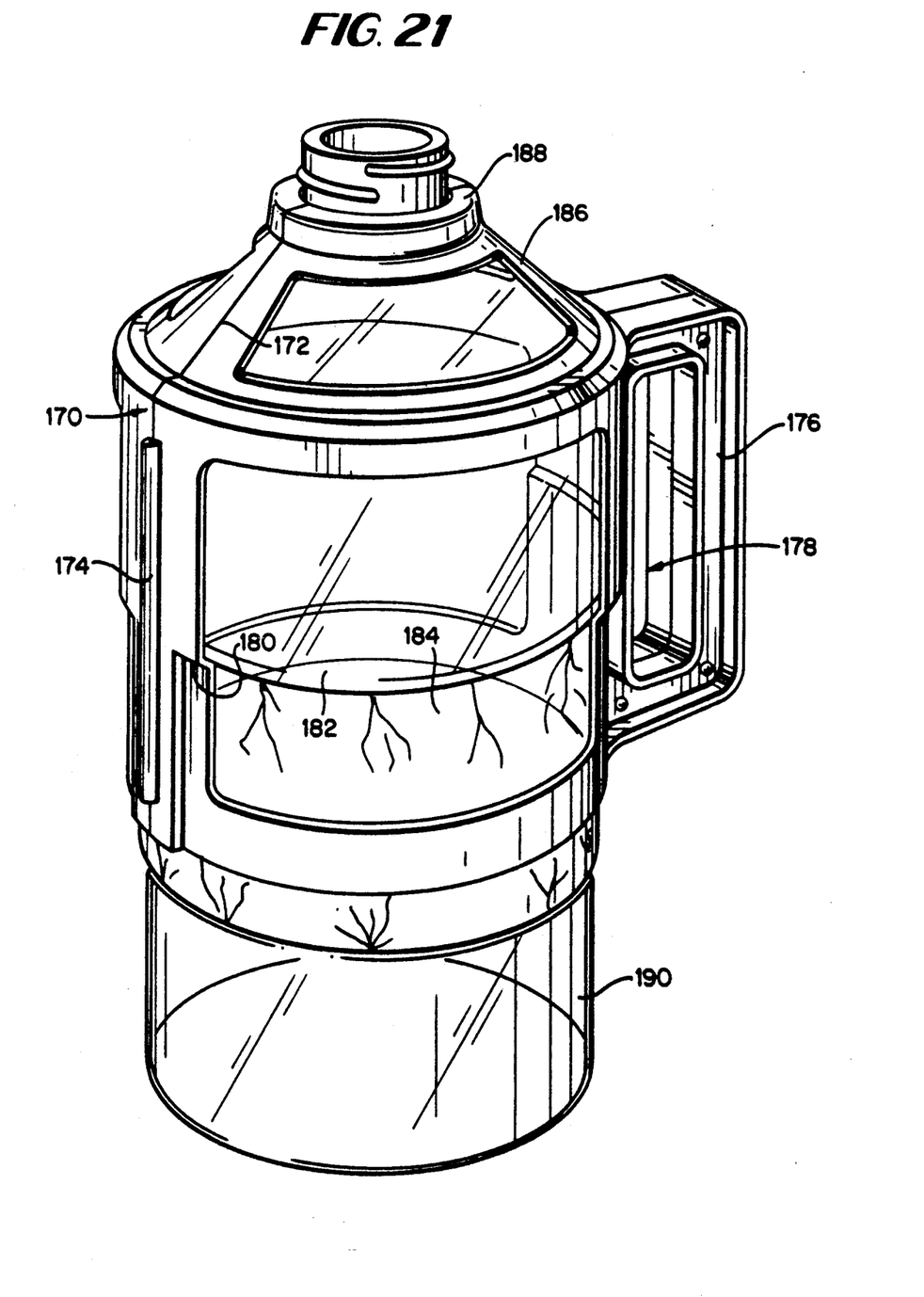
FIG. 21 is a perspective view of a container in accordance with this invention in combination with another exemplary holder, also in accordance with the invention.
Figure 22:
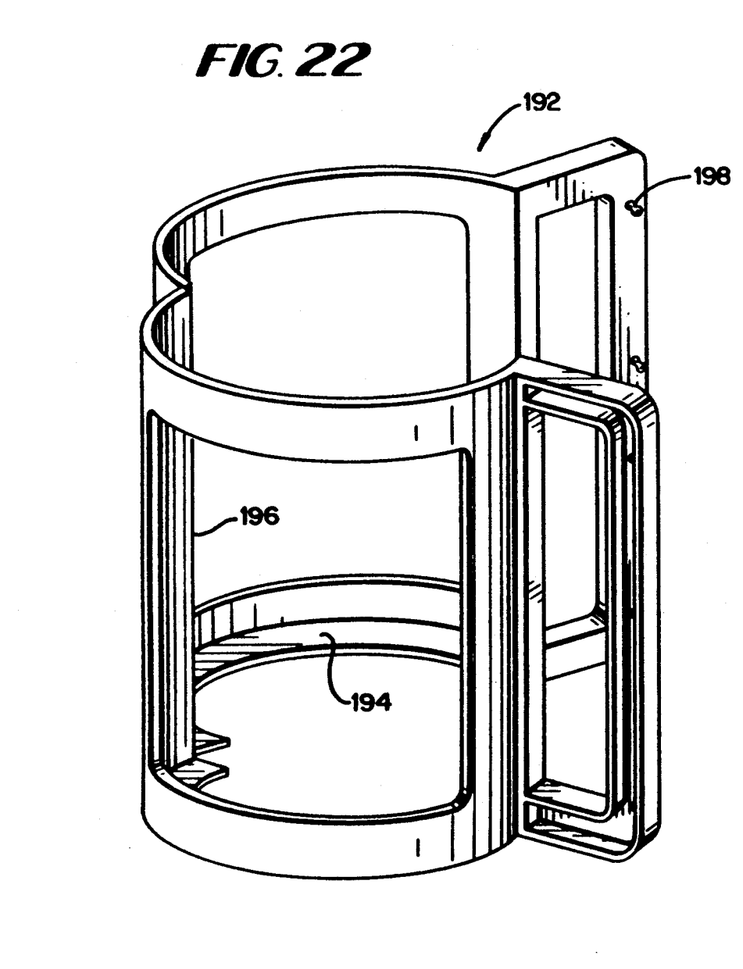
FIG. 22 is a perspective view of a container holder in accordance with this invention shown in an open position permitting loading of a container.

FIG. 21 discloses another embodiment of a suitable holder which, in this case, is of the clamshell type wherein an open frame holder 170 is vertically split along a seam 172 but held together along an opposite vertical edge by an integral, living hinge 174 which permits the holder to pivot between open and closed positions (similar to the arrangement shown in FIG. 22). The holder may be releasably secured opposite the hinge 174 by any suitable latch arrangement, preferably located inside handle 176 in the area generally designated by numeral 178.

The holder 170 in the closed position illustrated in FIG. 21, provides a substantially cylindrical open frame which engages a substantial portion of the container side wall. Of particular note is the radially inwardly directed step or shoulder 180 which is adapted to engage a corresponding step between an upper side wall portion of the container 182 and an intermediate thin wall portion 184 of the container side wall. Holder 170 also includes an upper tapered neck portion 186 which is also constructed as an open frame, and which terminates at an upper open end 188 which is adapted to substantially embrace the radially outwardly directed flange (not shown but similar to flange 22 of FIG. 1) on upper and lower surfaces of the flange to securely grip the container.

As shown, the holder 170 does not engage the lower portion 190 of the container side wall although it may be extended in the axial direction to do so if desired.

To release the container from the holder, the user simply releases the latching mechanism and opens the holder 170 by pivoting the two mirror image half sections about the living hinge 174 thereby releasing the container.

A variation of holder 170 is illustrated in FIG. 22 where the holder 192 is formed without the container neck engaging portion as in the FIG. 21 embodiment, but is otherwise axially extended to support the bottom wall of the container by means of a horizontal support shelf 194 extending radially inwardly form the lowermost portion of the holder. Holder 192, like holder 170, may be of one-piece plastic construction with a living hinge 196 enabling the holder to move between open and closed positions. In the FIG. 22 embodiment, he holder may be releasably secured in a closed position by means of a plurality of peg-like projections 198 which are adapted to be snapped into correspondingly located apertures on the opposite portion of the handle (not shown).

Figure 23:
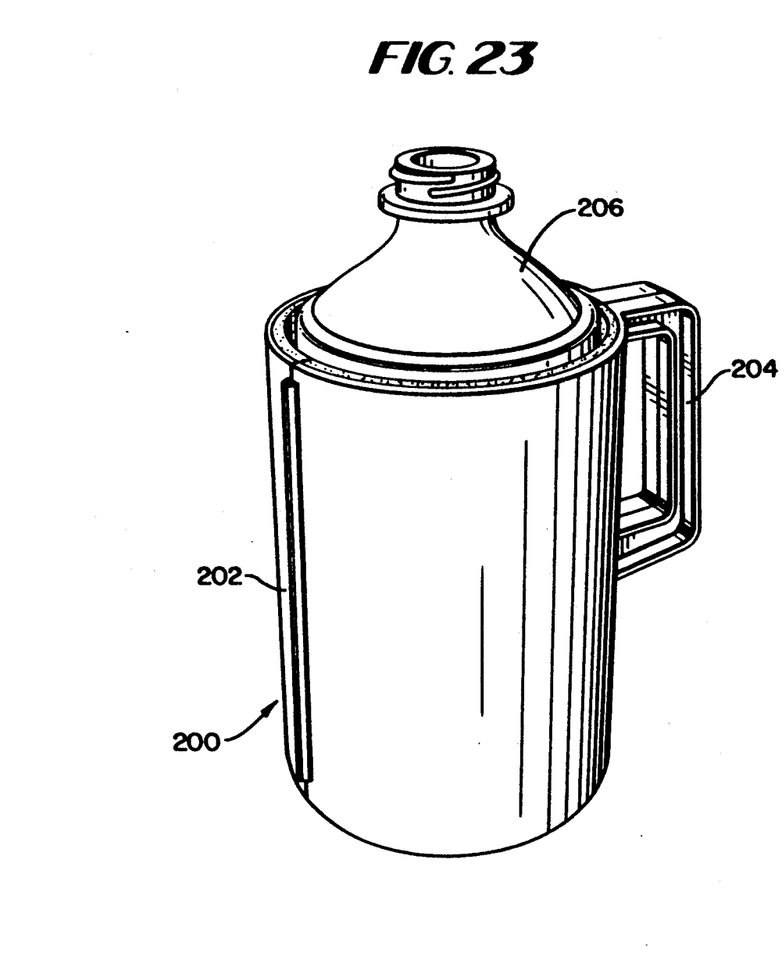
FIG. 23 is a perspective view of a container enclosed within a clamshell type holder, also in accordance with the invention.

Finally, with respect to FIG. 23, a substantially solid clamshell type holder 200 is shown which also includes split halves connected by an integral or living hinge 202. The holder 200 is otherwise constructed as an open-ended pitcher having a handle 204 and a bottom wall (not shown) which engages the bottom wall of the container 206. The vertically arranged integral hinge would, of course, permit easy loading and unloading of the associated container.

The above described exemplary embodiments of the invention contain numerous advantages from both a practical and an environmental standpoint. For example, from a practical standpoint, the collapsibility feature of the containers permits the efficient use of space from the standpoint of shipping, storage, and, ultimately, post consumer waste. At the same time, the incorporation of a very thin intermediate peripheral side wall portion effects a source reduction in the amount of plastic required for the manufacture of the container. A further advantage lies in the reusable nature of the container along with its collapsibility feature. Thus, after its initial use, the consumer may utilize the container for any number of purposes, and when not in use, the container may be efficiently stored in its collapsed configuration. By constructing the container so as to be easily and manually collapsed, expanded and recollapsed, the expected life of the container is substantially lengthened, and fewer containers will be disposed of after first use, thereby effecting even further reductions in post consumer waste volumes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A reusable plastic container comprising a bottom wall, a top wall and a side wall movable between extended and collapsed positions, said top wall including a tapered shoulder portion and an upstanding discharge portion defining a discharge opening, said side wall in the extended position including an upper portion, an intermediate portion and a lower portion and wherein said intermediate portion and said tapered shoulder portion have wall thicknesses less than wall thicknesses of said upper and lower portions of said side wall such that a ratio of each of the thicknesses of said upper and lower portions to the thickness of said intermediate portion is at least 3.75 to 1, and wherein said intermediate portion has a thickness of between about 2 and 12 mil, and further wherein cross-sectional areas of said side side wall portions individually decrease from top to bottom so that said side wall is axially and manually collapsible to the collapsed position where said upper and lower portions are telescoped one within the other with said intermediate portion reverse folded therebetween; and further comprising gripping means for enabling said container to be pushed and pulled in axially opposite directions to move said container between the collapsed and extended positions, said gripping means including a radially outwardly directed flange in said lower portion adjacent said bottom wall.

2. The container of claim 1 wherein said gripping means further comprises a radial flange adjacent said discharge opening.

3. The container of claim 1 wherein said radially outwardly directed flange has a larger cross-sectional area than any of said upper, intermediate and lower portions.

4. A collapsible, extendable and recollapsible container comprising:
a top wall including a tapered shoulder portion and upstanding dispensing portion adapted to receive a removable lid;
a bottom wall;
a peripheral side wall extending between said top and bottom walls and movable between extended and collapsed positions, said peripheral side wall in the extended position including a lower portion having a first cross sectional area and first wall thickness, an intermediate portion having a second cross sectional area and second wall thickness, and an upper portion having a third cross sectional area and third wall thickness substantially identical to said first wall thickness; wherein said second wall thickness is between about 2 and 12 mil and wherein a ratio of each of said first and third wall thicknesses to said second wall thickness is at least 3.75 to 1, and wherein said second cross sectional area is greater than said first cross sectional area and less than said third cross sectional area, such that said upper and lower side wall portions may be telescoped one within the other with the intermediate portion reverse folded therebetween;

means for facilitating axial collapse of said container to said collapsed position, said means located at an interface between at least one of said upper and lower portions and said intermediate portion; and wherein said tapered shoulder portion has a wall thickness less than said first and third wall thicknesses and less than a wall thickness of said upstanding dispensing portion whereby said tapered shoulder portion and said upstanding dispensing portion are collapsible into an area defined by said upper portion of said peripheral side wall.

5. The container of claim 4 wherein said means comprises a radially outwardly flared area adjacent a lowermost edge of said upper portion.

6. The container of claim 4 wherein said means comprises an annular indentation at an interface between said intermediate and lower portions.

7. The container of claim 5 wherein said means also comprises an annular indentation at an interface between said intermediate and lower portions.

8. The container of claim 4 and including gripping means at opposite ends of the container for manually moving the container between said collapsed and extended positions.

9. A reusable plastic container that is collapsible, extendable and recollapsible comprising:
 a dispensing portion at one end provided with means for receiving a removable lid;
 a bottom wall at an opposite end;
 a peripheral side wall extending between said dispensing portion and said bottom wall, said peripheral side wall including a lower portion having a first wall thickness, an intermediate portion having a second wall thickness and an upper portion having a third wall thickness substantially equal to said first wall thickness; wherein said second wall thickness is between about 2 and 12 mil and is less than each of said first and third wall thicknesses, such that a ratio of each of said first and third wall thicknesses to said second wall thickness is at least 3.75 to 1, and such that said peripheral side wall is repeatedly movable between collapsed and extended positions upon exertion of axially directed pushing and pulling forces, wherein in the collapsed position said upper and lower portions are telescoped one within the other with said intermediate portion reverse folded therebetween; and annular means for facilitating telescoping movement of said container to said collapsed position, said annular means located at interfaces between both said upper and lower portions and said intermediate portion.

10. The container of claim 9 wherein said first and third wall thicknesses are at least about 35 mil.

11. A reusable, collapsible and extendable container comprising:
 a peripheral side wall movable between extended and collapsed positions, said peripheral side wall in the extended position including at least a lower axially extending portion having a first wall thickness of at least about 35 mil, an intermediate axially extending portion having a second wall thickness between about 2 and 12 mil, and an upper axially extending portion having a third wall thickness substantially equal to said first thickness, wherein a ratio of each of said first and third wall thicknesses to said second wall thickness is at least 3.75 to 1; such that, said lower axially extending portion may be telescoped into said upper axially extending portion with said intermediate axially extending portion reverse folded therebetween in the collapsed position;
 a bottom wall at a lower end of said peripheral side wall; and
 a discharge opening at an upper end of said peripheral side wall, said discharge opening adapted to be closed by a removable lid.

* * * * *